US006956657B2

(12) United States Patent
Golini et al.

(10) Patent No.: US 6,956,657 B2
(45) Date of Patent: Oct. 18, 2005

(54) METHOD FOR SELF-CALIBRATED SUB-APERTURE STITCHING FOR SURFACE FIGURE MEASUREMENT

(75) Inventors: Donald Golini, Rochester, NY (US); Greg Forbes, N Epping Sydney (AU); Paul Murphy, Rochester, NY (US)

(73) Assignee: QED Technologies, Inc., Rochester, NY (US)

( * ) Notice: Subject to any disclaimer, the term of this patent is extended or adjusted under 35 U.S.C. 154(b) by 292 days.

(21) Appl. No.: 10/303,236

(22) Filed: Nov. 25, 2002

(65) Prior Publication Data

US 2003/0117632 A1 Jun. 26, 2003

Related U.S. Application Data

(60) Provisional application No. 60/341,549, filed on Dec. 18, 2001.

(51) Int. Cl.$^7$ ................................................. G01B 9/02
(52) U.S. Cl. ........................................................ 356/512
(58) Field of Search .......................... 356/511–516, 450, 356/489, 495

(56) References Cited

U.S. PATENT DOCUMENTS 5,960,379 A * 9/1999 Shimizu et al. ............. 702/155
5,986,668 A * 11/1999 Szeliski et al. ............. 345/634
5,987,189 A * 11/1999 Schmucker et al. ........ 382/284
6,097,854 A * 8/2000 Szeliski et al. ............. 382/284
6,611,791 B1 * 8/2003 Kase et al. .................. 702/167

* cited by examiner

Primary Examiner—Andrew H. Lee
(74) Attorney, Agent, or Firm—Neal L. Slifkin (57) ABSTRACT

A method for accurately synthesizing a full-aperture data map from a series of overlapped sub-aperture data maps. In addition to conventional alignment uncertainties, a generalized compensation framework corrects a variety of errors, including compensators that are independent in each sub-aperture. Another class of compensators (interlocked) include coefficients that are the same across all the sub-apertures. A constrained least-squares optimization routine maximizes data consistency in sub-aperture overlap regions. The stitching algorithm includes constraints representative of the accuracies of the hardware to ensure that the results are within meaningful bounds. The constraints also enable the computation of estimates of uncertainties in the final results. The method therefore automatically calibrates the system, provides a full-aperture surface map, and an estimate of residual uncertainties. Therefore, larger surfaces can be tested with greater departures from a best-fit sphere to greater accuracy than was possible in the prior art.

11 Claims, 5 Drawing Sheets

METHOD FOR SELF-CALIBRATED SUB-APERTURE STITCHING FOR SURFACE FIGURE MEASUREMENT

This application claims benefit of U.S. Provisional Application No. application 60/341,549 with a filing date of Dec. 18, 2001.

BACKGROUND OF THE INVENTION

1. Field of the Invention

The present invention relates to methods and apparatus for surface and wavefront topology; more particularly, to methods and apparatus for mathematically stitching together a plurality of overlapping individual sub-aperture maps to yield a full-aperture map of a surface; and most particularly, to such methods and apparatus wherein accuracy and resolution are increased through constrained simultaneous stitching of all sub-aperture data sets.

2. Discussion of the Related Art

The basic goal of sub-aperture metrology is to obtain a full-aperture measurement of a test part, without having to measure the entire part at one time. Because the relative position of each sub-aperture measurement is not known exactly, there is some ambiguity when combining the individual sub-apertures into a full aperture map. Accurately resolving this ambiguity is the fundamental task faced by all sub-aperture stitching methods. The uncertainty is largely due to alignment errors (small, unknown displacements) and noise in the individual sub-aperture maps. Sub-aperture stitching is thus an optimization problem: the goal is the minimization of the discrepancy between multiple data sets by including components related to various alignment errors. These added components are referred to herein as "compensators" and their form is evidently fixed by considering small displacements of, say, the test surface. For example, tilting a flat surface adds a linear component to the surface measurement (along the direction of the tilt). Some important features of a particular stitching method are the figure of merit and the compensators that it employs.

Sub-aperture interferometry was originally introduced to avoid the expense of fabricating large reference optics for testing astronomical mirrors. Publications in this area through the 1980's combine non-overlapping (sub-aperture) data sets into a smooth global map (i.e. they assume a priori knowledge that the test surface is smooth). In effect, the figure of merit is chosen to reflect the notion of "global smoothness". Three or four compensators are used: piston and two tilts, with power also included when testing non-flat surfaces. These components are chosen for each sub-aperture so that, when tiled appropriately, the modified data sets appear to give windowed views into a map that is globally smooth. The high-resolution information of the individual maps is typically lost, as only a global polynomial fit is retained.

More recently, it is known to overlap the individual sub-aperture data sets. The unknown additive piston and tilts in each sub-aperture can then be determined by maximizing the data consistency in the overlap regions (i.e. still only 3 compensators, but the figure of merit becomes self evident). What at first appears to be redundant data in the overlap regions (e.g. multiple data values at many points on the test surface) is actually the key to stitching sub-aperture data sets together more effectively. This criterion of self-consistency replaces the more nebulous a priori requirement for "global smoothness". As a result, rather than extracting just a global polynomial fit to the data, the high-resolution information of the individual maps can be retained.

It is known to use an automated stitching interferometer for testing large (>400 mm) flat optics. Also known is the importance of first performing a high-precision calibration of the reference flats. Significant new challenges appear, however, when these sub-aperture stitching techniques are applied to non-plane surfaces.

For example, sub-aperture measurement techniques have also been applied to rotationally-symmetric aspheres. It has been proposed to take a series of interferograms at different longitudinal positions of the test surface. Each interferogram gives an annular sub-aperture of useful data (i.e. within a zone centered on the asphere's axis). In this case, power compensation must be associated with each of the zonal data sets (in addition to piston and tilts) to create a consistent global result. This extra freedom follows from the fact that the test wavefronts are now spheres of different curvature, and relative motion thus generates a new effect. Because of this extra freedom, the process is not as well conditioned: that is, there is a greater sensitivity to errors and noise. The accuracy of the end results consequently suffer, especially in the rotationally symmetric components of the surface figure.

U.S. Pat. No. 5,416,586 discloses methods for annular stitching of aspheres. These methods include overlap between the different annuli to reduce the error sensitivity. These annular stitching methods extend the testing capability only to larger aspheric departures; they do not address the particular challenges associated with the testing of large-aperture surfaces, nor are they particularly robust in the presence of noise and misalignments. This is especially so if the amount of overlap is reduced to moderate levels.

U.S. Pat. No. 5.991,461 discloses a related technique for testing flats with an interference microscope. The basic idea remains the same, only on a reduced scale: individual sub-apertures now can have dimensions of the order of one millimeter or less. The unknown pistons and tilts in each sub-aperture are compensated, while retaining the high-resolution data. This method uses progressive pair-wise stitching (the tilt and piston are determined one sub-aperture at a time). Such a process is sensitive to the order of operations, and stitching errors can accumulate. In this particular method, the number of "good" data points in each overlap region determines the order of stitching. The overlap region with the most valid data is stitched first. Successive sub-apertures are chosen that have the most valid points in common with the data that have already been stitched. Other than suggesting a certain level of overlap, this method does not include any methodology for error reduction. In particular, sub-aperture placement errors are implicitly assumed to be negligible. Higher resolution measurements will either be contaminated by such errors, or require correspondingly accurate mechanical stages.

A related known method for stitching microscope data also utilizes progressive pair-wise stitching, but with a more sophisticated algorithm. A quantitative statistical criterion determines the order of stitching. Then the data most likely to be stitched well (under this criterion) are stitched first, and this helps to reduce error accumulation. Further, it is also known to use correcting sub-aperture placement errors, using unknown lateral and rotational components as well as the "conventional" linear compensators (piston and tilts in this case) which turns the stitching process into a computationally demanding non-linear problem. This method thus cannot stitch all data sets simultaneously (which is less sensitive to error accumulation than pair-wise stitching). While conventional "noise" terms, such as video noise, PZT miscalibration, vibration, etc., can affect the quality of the result, they can be suppressed somewhat in the stitching.

However, even with "perfect" stitching, systematic errors (such as a non-flat reference surface, imaging aberrations and distortion) can accumulate and be magnified by this traditional stitching process. Addressing such matters is an important component of the present invention.

U.S. Pat. No. 5,960,379 discusses placement compensation in stitching. A six-dimensional position compensation scheme is proposed (three translations and three rotations). The authors then describe how using all six give unreasonable results. They find that all but one of the positional compensators are highly sensitive to noise in the relatively small overlap regions. Because optimization over all six compensating variables is so ill conditioned, they recommend using only the most significant of the six (i.e. deviation along the surface normal). This improves upon the accuracy achieved with six compensators, but the overall accuracy of the stitching technique then falls well short of that achieved on an individual sub-aperture measurement. In contrast, the present invention employs many compensators, with a constrained optimization, to ensure that the process is robust and the results are accurate.

Regarding calibration, the simplest calibration technique is the use of a reference standard. If a "perfect" surface is tested on some metrology instrument, only the measurement bias and noise of the instrument are evident in the measurement. Essentially the test and reference surfaces exchange roles for this calibration measurement, and averaging over multiple measurements can help to reduce any random components. Subsequent measurements can then approach the accuracy of the "perfect" surface by subtracting the calibration measurement. Such methods naturally require a high-quality and stable reference standard of sufficient size. Furthermore, thermal effects and changes in the instrument alignment can invalidate the calibration. Because of these difficulties, a variety of alternative prior art approaches to calibration have been developed and refined for interferometers.

The earliest such technique is known in the art as the "three-flat" test. Three surfaces are required, and they are first tested against each other in pairs (3 measurements). One of the surfaces is then rotated by 180 degrees and re-tested. Combining these four measurements allows for "absolute" data along one-dimensional stripes on the surfaces. The basic method has been advanced by using a Zernike surface representation to give two-dimensional results, and the method has been further extended to test spheres in addition to flats. The data processing of these methods, however, typically involves polynomial fitting (thereby reducing the resolution in the end results).

Another prior art technique applies only to the testing of spherical surfaces of non-zero curvature. Unlike the three-flat test, only two surfaces are required, ie. just the reference and test surfaces. The test part is measured in three different configurations: (i) the original (confocal) position, (ii) again confocal but rotated by 180 degrees about the optical axis, and (iii) the so-called cat's eye position (for which the test surface sits at the focus of the reference wave). The interferometer's system error is removed by combining the measurement data in a prescribed fashion. Calibration can be improved by taking additional measurements at the confocal position: by using four measurements with 90 degree offsets, it is possible to alleviate a misalignment contribution. Of course, this method does not apply to the calibration of either transmission flats or divergers, because neither has an accessible cat's eye position.

A further common technique of calibrating interferometers takes advantage of statistics. A calibration part is used, but it need not be "perfect" (unlike the reference standards discussed above). Instead, it should have a random distribution of error past some statistical correlation length. This means that two measurements, displaced spatially by the correlation length (or greater), are statistically uncorrelated. In applying this method to interference microscopy, a relatively high quality flat is measured in a variety of positions (separated by the correlation length of the surface or greater) on the interference microscope. All N measurements are then averaged together, providing an approximation of the interferometer system error. This approximation is (theoretically) good to the quality of the "reference" surface, divided by $\sqrt{N}$. This general averaging technique has also been applied to systems with larger apertures, though lower spatial frequency features ("figure/form errors") tend to be correlated. Nevertheless, this method has been used to cross-check other calibration methods for LIGO optics. Additionally, this technique has been employed on ball bearings to calibrate spherical reference surfaces.

U.S. Pat. No. 5,982,490 discloses an interesting variant that combines aspects of the aforementioned methods. The averaging technique is employed to obtain the asymmetric component of the surface. To get the rotationally symmetric component, however, a translated measurement is needed. The figure error is then computed with the aid of a polynomial fit. Translating the optic introduces some complications, though, particularly with distortion and edge effects (which the patent addresses to some extent). Because it is extracted as a polynomial fit, only a low-resolution map of the rotationally symmetric component of figure error is determined in this way. Although the approach disclosed in the present invention also involves rotating and translating the test surface, it is done in a manner that allows polynomial fitting to be applied only to the reference surface. This means that in the present invention the final results for the test surface can effectively retain the full resolution of the sub-aperture maps. This is especially effective when the mid- and high-frequency figure errors on the interferometer optics and the reference surface are much weaker than those on the test part.

In summary of the limitations of the prior art, despite the volume of prior art in stitching interferometry, no general stitching solution is currently available for non-flat surfaces. Large flats can be stitched without loss of resolution using a fairly robust algorithm (minimize mean-square error in all overlap regions simultaneously). The stage positioning accuracy required to keep the error magnification within reasonable bounds can be achieved readily since only two axes are needed; correction of positioning errors in software is thus unnecessary. Interference microscope data has also been stitched for smaller flats. Again, the lateral range is extended without loss of resolution, but there are accuracy losses. Pair-wise stitching algorithms, in particular, allow errors to accumulate. Stitching has also been performed on aspheres, but only to extend the aspheric departure that can be measured; this "zonal" stitching provides no gain in lateral resolution or range, and again comes at the price of accuracy losses. Although the prior art includes the possibility of position error correction within stitching, no one has reported an effective way to achieve this when stitching all sub-apertures simultaneously. The prior art in calibration also offers dedicated solutions to the problems associated with some global system errors (such as reference wave error). However, these problems can be addressed more effectively with a platform and method designed for stitching interferometry. Further, other components that are vital for accurate stitching (such as distortion correction) have not been addressed. A number of innovations are therefore needed to create an effective multi-axis system for accurate sub-aperture tests of non-flat parts.

It is a primary objective of the invention to synthesize a full-aperture numerical data map of a test surface of an object from a plurality of overlapping sub-aperture data maps of the surface.

SUMMARY OF THE INVENTION

Briefly described, the present invention provides a method for sub-aperture stitching of measurement data to provide a high accuracy, high-resolution, full-aperture map of a surface; where calibration of dominant system errors is an integral feature. Each potential error in a sub-aperture measurement is assigned a compensator. The error compensation can either vary in different sub apertures, referred to herein as "free compensators", or have the same value in all sub-apertures, referred to herein as "interlocked compensators". The stitching employs the compensators to minimize discrepancy of all areas of measurement overlap simultaneously. This general framework allows any number of compensators to be employed, which can cause the numerical optimization to become ill conditioned. The current invention mitigates this by introducing constraints on the compensator amplitudes. It also provides measures of uncertainty of the stitched map.

The preferred measurement instrument is a surface-measuring interferometer. The measured parts can have large transverse size (clear aperture) and/or angular extent (numerical aperture). Furthermore, the stitching can further extend the vertical dynamic range of the interferometer, allowing larger aspheric departures to be tested with a spherical reference. Interlocked compensators are used to account for the systematic errors of reference wave, pixel scale, and distortion. Free compensators account for angular and positional misplacement (including the usual error compensation of piston, tilt, and power). The compensator amplitudes are constrained to be within the accuracies of the machine and interferometer hardware.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

Discussion of Hardware Platforms and Other Considerations

Figure 1:
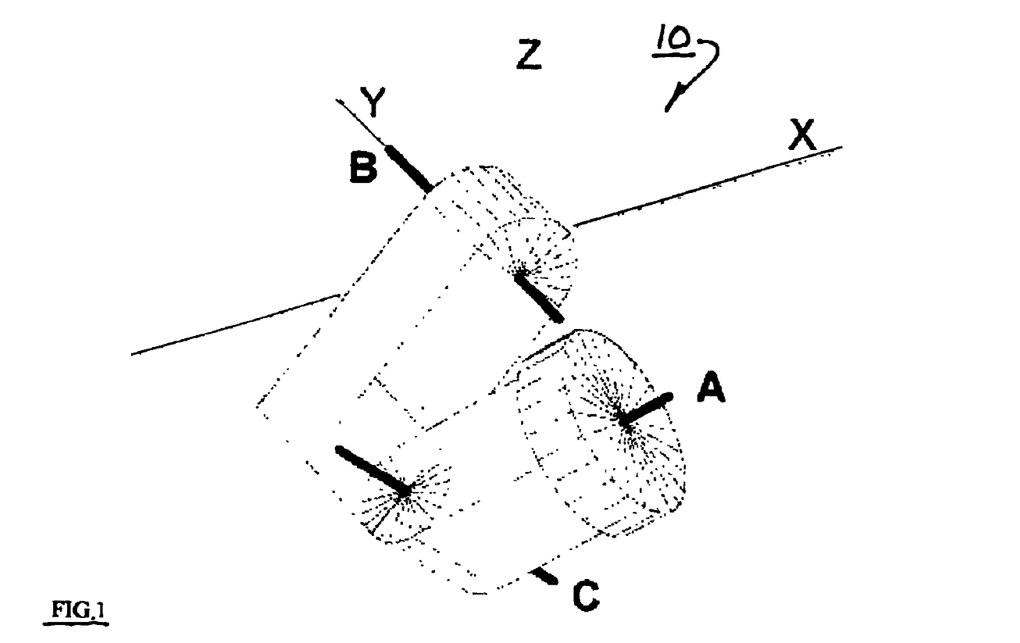
FIG. 1 is a schematic isometric depiction of one possible axis configuration of a system subject to measurement by a method in accordance with the invention.
Figure 2:
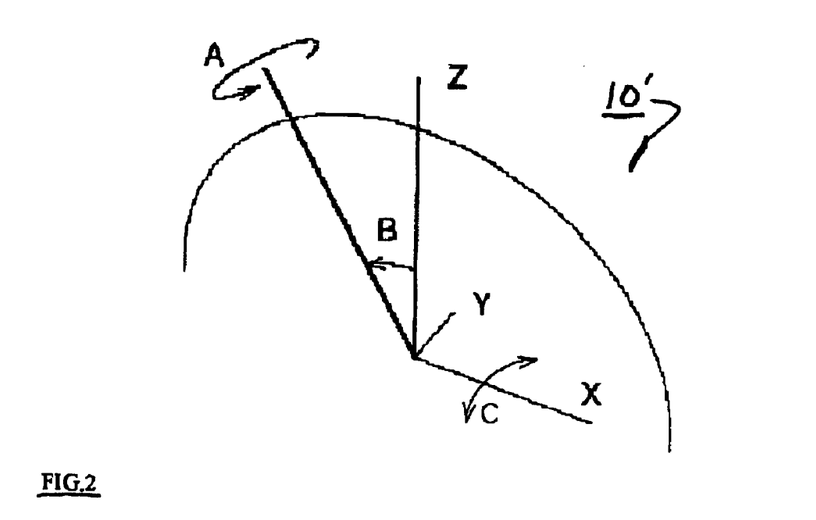
FIG. 2 is a second schematic representation of the axis configuration shown in FIG. 1.

The basic motion of a flat part for stitching can be realized by using just a pair of transverse translation stages. Additional axes are helpful, however, for practical use in a particular instrument. For example, the limited vertical dynamic range of an interferometer generally requires the fine "nulling" motions of the stages. Nulling an interferogram from a flat requires tip and tilt, while z motion is needed to achieve a confocal configuration on a sphere. Many mechanical configurations can generate these desired motions. Referring to FIGS. 1 and 2, a general-purpose configuration 10, 10', respectively, for such motions is shown wherein there are six mechanical axes—three for translation (X, Y, Z) and three for rotation (A, B, C). The stages need to position the part such that a nominal null can be achieved at any point on the test surface. All of the mechanical stages may be either under automatic or manual control. Such control is not an essential part of the process.

Figure 3:
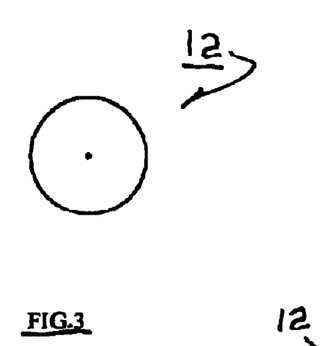
FIG. 3 is a plan view of a sub-aperture field.
Figure 4:
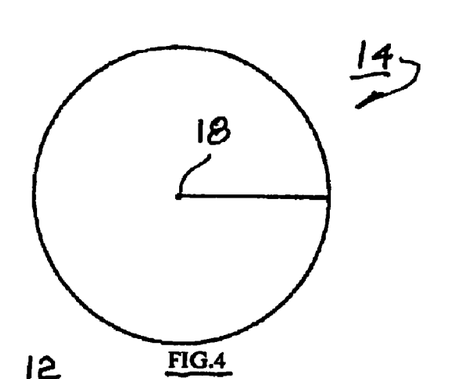
FIG. 4 is a plan view of a full-aperture field to be measured by multiple overlapping determinations of the sub-aperture field shown in FIG. 3.

Referring to FIGS. 3 and 4, an individual interferometer sub-aperture field 12 having a diameter that may be less than the diameter of a full-aperture surface 14 is systematically disposed over a full-aperture surface 14, as shown, for example, in FIGS. 6 through 12, to provide an overlapping lattice 16 of sub-aperture data sets in accordance with the invention to provide a full-aperture measurement. Although the part and the sub-aperture are shown to be circular (in accordance with common optical surfaces and interferometers), this is not a necessary feature of this stitching method. Furthermore the process may be applied to full aperture measurements (where the instrument aperture is larger than the part aperture) to take advantage of the present invention's accuracy gains.

Figure 5:
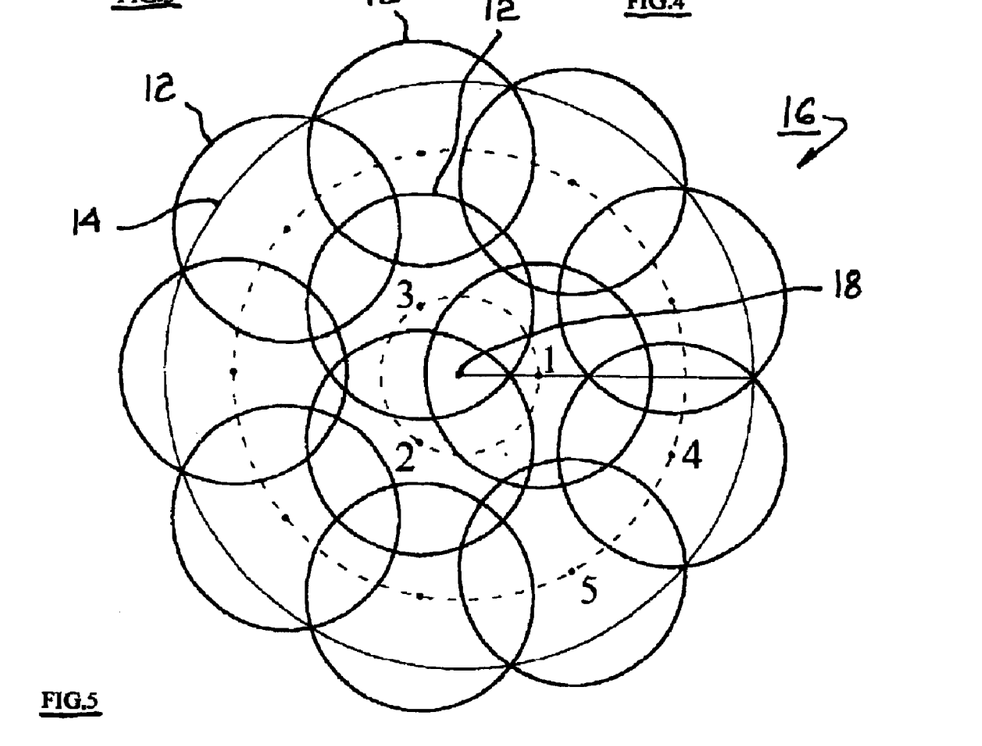
FIG. 5 is a plan view showing a possible multiple overlapping lattice of determinations in accordance with the invention.
Figure 6:
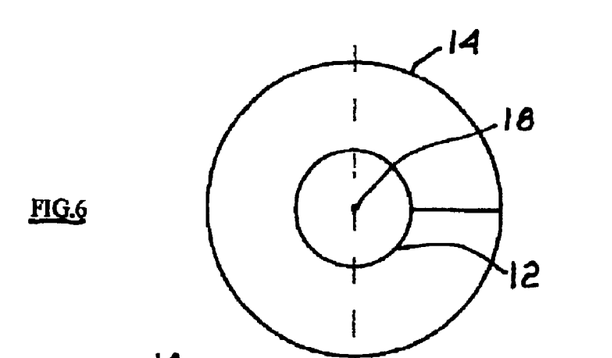
FIGS. 6 through 12 are a sequence of plan views showing the sub-aperture field of FIG. 3 cooperating with the full-aperture field shown in FIG. 4 and the motion axes of FIG. 2 to provide the multiple overlapping lattice of determinations shown in FIG. 5.
Figure 7:
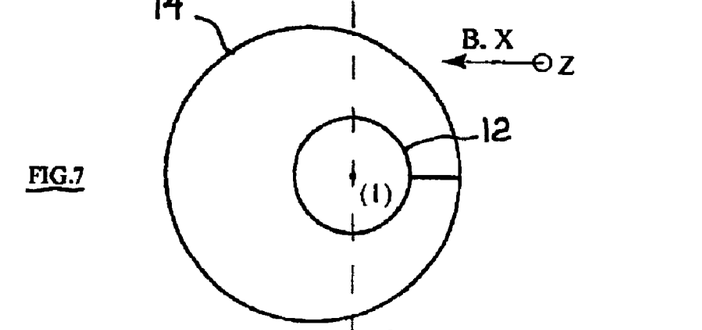
Figure 8:
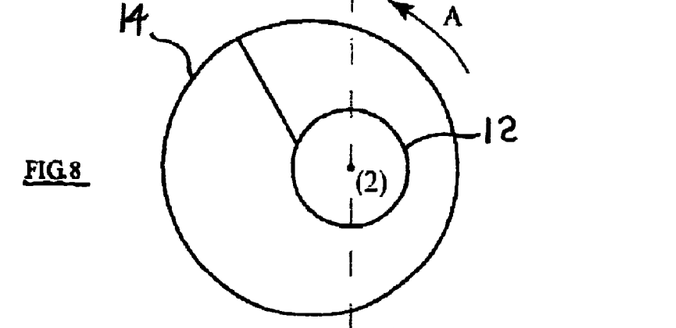
Figure 9:
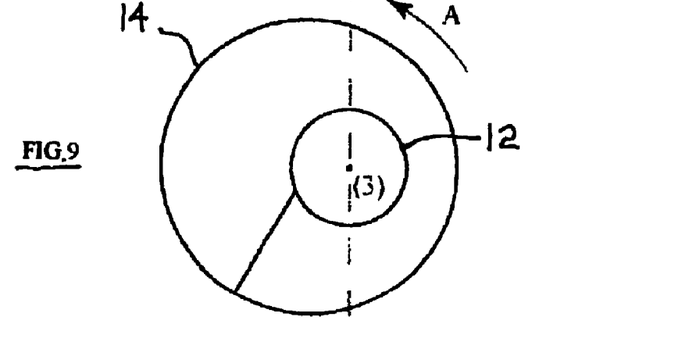
Figure 10:
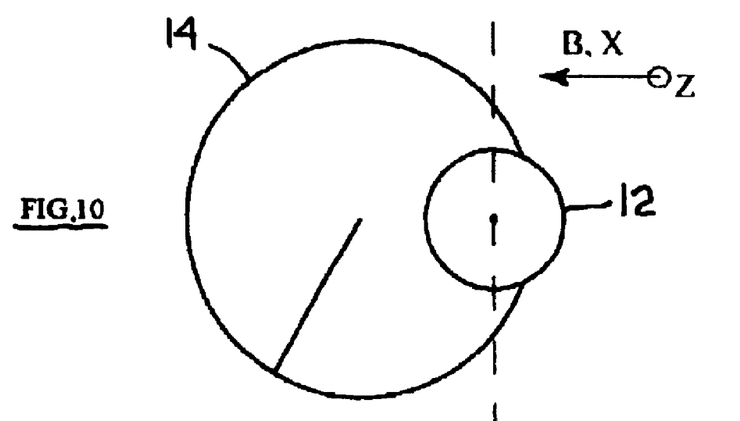
Figure 11:
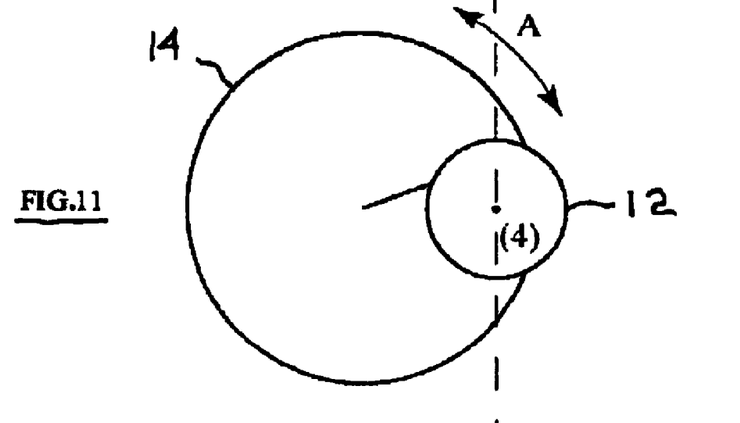
Figure 12:
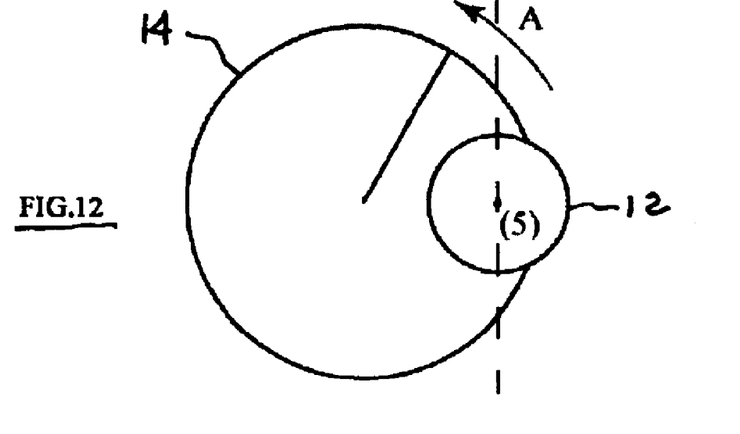

Referring to FIGS. 5 through 12, a data-collection method in accordance with the invention includes the steps of:

a) FIG. 6, establishing the origin position (A=0, B=0), wherein the sub-aperture field 12 and full-aperture surface 14 are concentric on center 18;

b) FIG. 7, translating the full-aperture surface 14 in a B, X, and Z direction (only X for a flat surface) by a distance less than one radius of sub-aperture field 12 to establish a first "ring" of sub-aperture measurements (A=a10=0, B=b1, X=x1, Z=z1), and acquiring a first phase measurement (1) at the first angular position; (note that the preferred angles, number of sub-apertures, and number of rings are specific to the lattice in question, and are chosen so that the lattice covers the part and the sub-aperture measurements overlap both radially and circumferentially.

c) FIG. 8, rotating full-aperture surface 14 through an angle, preferably 120°, to a second angular position for the first ring (A=a11, B=b1, X=x1, Z=z1), and acquiring a second phase measurement (2);

d) FIG. 9, rotating full-aperture surface 14 through an angle, also preferably 120°, to a third angular position for the first ring (A=a12, B=b1, X=x1, Z=z1), and acquiring a third phase measurement (3), measurements 1,2,3 mutually overlapping on center 18, and measurements 1,2, 2,3, and 1,3 respectively, also overlapping each other, as shown in FIG. 5;

e) FIG. 10, translating full-aperture surface 14 in a B, X, and Z direction (only X for a flat surface) by a distance less than one radius of sub-aperture field 12 to establish a second "ring" of sub-aperture measurements (A=a12, B=b2, X=x2, Z=z2);

f) FIG. 11, rotating full-aperture surface 14 through an angle, preferably 40°, to a first angular position for the second ring (A=a12, B=b1, X=x1, Z=z1), and acquiring a fourth phase measurement (4);

g) FIG. 12, rotating full-aperture surface 14 through an angle, preferably 40°, to a second angular position for the second ring (A=a21, B=b2, X=x2, Z=z2), and acquiring a fifth phase measurement (5); and h) repeating step g) until the remaining seven sub-apertures are acquired.

If outer portions of surface 14 remain unscanned at this point, the surface may be translated yet again to establish a third ring and rotated to a first angular position (A=31, B=b3, X=x3, Z=z3), and a third ring of overlapping phase measurements may then be generated in fashion similar to the first and second rings just described. Further, one or more measurements may be acquired at the center position as well (i.e. B=X=0).

Conventional stitching on a flat involves just three compensators per sub-aperture, namely dc and two tilts. Even so, the final results can be highly sensitive to sub-aperture misplacement, instrument bias, data mapping (image distortion), and various random errors (such as thermal or electronic noise effects). This means that the accuracy of the resulting stitched data map tends to be significantly less than that of the individual sub-aperture measurements themselves. When conventional interferometric stitching is applied to a spherical test part, the process is even less well conditioned. This is largely because the reference wavefronts are now concentric spheres (hence of different curvature). A new compensator (often referred to in the prior art as "power") is then required to account for the part's misplacement along the interferometer axis. The addition of more independent compensators, however, adversely affects the computational stability of conventional stitching processes.

Because conventional stitching is even more ill conditioned when working on spheres, modifications become crucial. The four basic compensators mentioned above are found by considering the change in the measured data that is associated with slight motions of a perfectly spherical part. (For a perfect sphere, lateral translations are indistinguishable from tip and tilt, so there are only three motion compensators aside from the do offset.) The ill conditioning of the stitching process means that the optimized stitching (and thus the final stitched surface) is unduly sensitive to small changes in the input data. When the discrepancy in the overlapping data sets is minimized, the basic compensators "correct" any discrepancies they can in the data sets, regardless of the source of the discrepancy. Correcting for as many error sources as possible leads to more reliable stitched results. For example, although the random errors are generally relatively small, they can be reduced further when necessary by averaging over multiple data sets. More importantly, however, some of the other more dominant and consistent errors can be explicitly corrected as part of the stitching itself. This can significantly improve the robustness of the overall process. In fact, because of the corrections enabled by the self-consistency checks, it is even possible to achieve greater accuracy in the stitched results than was in the original sub-aperture data sets. This is a definitive feature a system in accordance with the invention.

Discussion of Compensators to Correct for Lateral Scale Errors

Many applications of figure metrology are for quality assurance, to ensure that a particular part meets some quality metric. For example, a part might have specifications on peak-to-valley, rms, and/or slope deviations. The details of the surface to measurement mapping are largely unimportant in such cases; those metrics are insensitive to slowly varying mapping errors. When placing the sub-aperture data onto a global coordinate plane, however, the mapping is crucial for stitching into a unified map. For a flat, only first-order mapping effects (lateral scale/magnification) are essential. In the case of an interferometer, however, distortion is often present in the imaging so that a square part appears on the detector as either a "pincushion" or a "barrel". If this effect is not corrected, the ill-conditioned character of the stitching process means that, even though the distortion may appear to be a minor factor within each sub-aperture, significant errors can be introduced to the stitched data. Notice also that the sub-aperture data that end up in zones of overlap during stitching typically come from the outer regions on the detector. This is precisely where the effects of scale and distortion discrepancies tend to be strongest.

Figure 13:
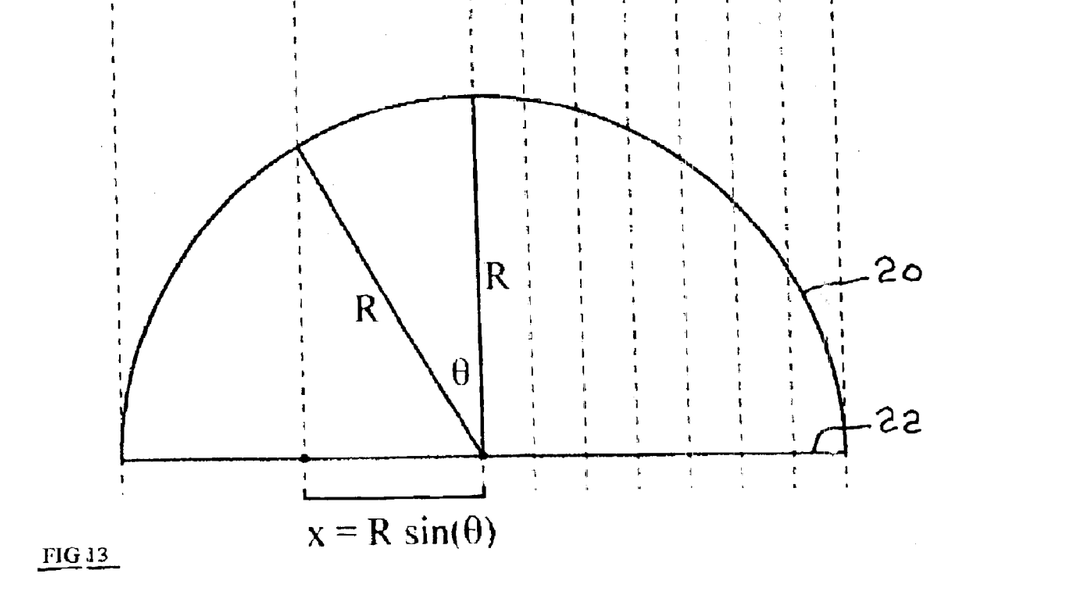
FIG. 13 is a meridional section showing sine distortion in mapping data from a spherical surface onto a plane.

For the metrology of a sphere, some type of distortion is essential because the measured data are recorded on a plane. When the interferometer is axially symmetric and the part's center of curvature lies on this axis, any point on the detector necessarily has the same azimuthal position as its associated spot on the part. A reasonable approximation for many systems is that the radial position on the detector is proportional to the sine of the angle between the axis of the interferometer and the nominal surface normal at the associated point on the part. The tangent of this angle or even the angle itself may also be considered as other reasonable options for a first approximation to the system distortion. In fact, it is necessary to choose a specific option like one of these in order to define the global coordinate plane on which the stitched data are to be assembled. Of course, this choice need not coincide with whatever happens to best describe the distortion in the sub-aperture data. (In fact, they may need to be quite different. For example, when modest numerical aperture tests are stitched together to give global data for a part that extends beyond a hemisphere, the raw angle is the only workable option from among the three just mentioned for the radial coordinate on the global plane. This is because the sine and tangent options no longer give a one-to-one mapping.) The meridional section of a hemispherical surface 20 having radius R, as shown in FIG. 13, demonstrates the nature of the mapping from the detector to the global coordinate plane 22 when coordinates are sine-like. The generalization to three dimensions is straightforward. Similarly, the analogous results for other types of system distortion follow from elementary geometric considerations.

It is now understood that an approximation to the basic mapping from pixels in each sub-aperture data set to points on the global plane is known once (i) a specific radial coordinate has been chosen for the global coordinates and (ii) the nominal distortion and pixel scale in a single sub-aperture data set have been determined. As pointed out above, refinements to this approximation are typically needed in order to eliminate significant errors from the stitched results. This slight change can evidently be accounted for by distorting the coordinates in each sub-aperture data map to force them to match the nominal distortion. For axially symmetric systems, the dominant distortion correction is purely radial, so that is all that is considered explicitly here. Nevertheless, this same approach can be generalized to account for asymmetric distortions if necessary. Since only a small non-uniform shift is generated in the sub-aperture data, a first-order approximation is generally adequate. As a result, this effect can be accounted for simply by introducing additional compensators.

If a single sub-aperture data set is written as f(x,y), the three conventional compensators for stitching on a flat mean that these data may be replaced by $$f(x,y) + a + b\ x + c\ y \quad \text{(Eq. 1)}$$

Here, a, b, and c are the strengths of the dc and x- and y-tilt compensators, respectively. These parameters are referred to herein as "stitching coefficients". The tilt compensators take the simple form given in Eq. 1 because it has been assumed for simplicity in this example that the interferometer is nominally distortion free. When testing a spherical part, the tilt terms would again take this same simple form provided the nominal distortion of the interferometer is sine-like, but a power term would then also need to be included. If the coordinate origin is taken to sit where the optical axis hits the detector, a radial distortion correction means that the original data is now to be replaced by $$f[u(\rho^2)x, u(\rho^2)y] \quad \text{(Eq. 2)}$$

where $\rho^2 = (X^2+y^2)/r^2$ and r is the radial distance to the furthest point from the origin in any of the sub-aperture data sets. Thus $0 < \rho < 1$. The function u that appears in Eq.(2) is slowly varying and its value is always close to unity when its argument is between 0 and 1. An effective step therefore is to express u as a polynomial:

$$u(\rho^2) = 1 + D(\rho^2) = 1 + d_0 + d_1\rho^2 + d_2\rho^4 + \ldots d_n\rho^{2n} \quad \text{(Eq. 3)}$$

wherein the dimensionless constants in this expression evidently satisfy $|d_j| << 1$ for all j. It can now be seen from Eq. 2 that $d_0$ gives a fine correction to the pixel scale, $d_1$ corrects for what is usually called third-order distortion, $d_2$ for fifth-order, etc. Since the low-order terms generally dominate, it is often sufficient for n to be just one or two.

Since $D(\rho^2)$ is always much less than unity, it is reasonable to expand the result of substituting the expression in Eq. 3 into Eq. 2 as a Taylor series in D. When only the first-order term is retained in this expansion, the corrected subaperture data set is found from Eq. 2 to be given approximately by $$f(x,y) + \left[x\frac{\partial f}{\partial x}(x,y) + y\frac{\partial f}{\partial y}(x,y)\right] D(\rho^2) \quad \text{(Eq. 4)}$$

If we take n=1 in Eq. 3 to give a simple example, Eq. 4 can be written as $$f(x,y) + d_0\left[x\frac{\partial f}{\partial x}(x,y) + y\frac{\partial f}{\partial y}(x,y)\right] + \\ d_1\left\{\left[x\frac{\partial f}{\partial x}(x,y) + y\frac{\partial f}{\partial y}(x,y)\right]\rho^2\right\} \quad \text{(Eq. 5)}$$

The factors on $d_0$ and $d_1$ in Eq. 5 are the new compensators. When n>1, it is evident from Eqs. 3 and 4 that the associated new compensators simply pick up extra factors of $\rho^2$.

Upon replacing f(x,y) in Eq. 1 with the entire expression in Eq. 5, it is clear that the new compensators play similar roles to the conventional ones: once these data sets have been placed on a global coordinate plane, one is free to pick $d_j$ for j=0,1, ... n as well as a, b, and c in order to minimize any discrepancy in the regions of overlap. There is an important difference, however: a, b, and c are free to take independent values for each of the sub-apertures, but each $d_j$ must take the same values for all of the sub-apertures. This is because a, b, and c account for independent misplacement errors while $D(\rho^2)$ characterizes the optics in the interferometer (which are not changed from one sub-aperture to the next). Compensators whose stitching coefficients are the same for all sub-apertures are referred to herein as "interlocked compensators", while the coefficients that can take independent values are "free compensators". This interlocking not only means that the solutions are sensibly grounded in the physics of the measurement process, but it also helps to reduce the ill-conditioned character of the stitching. Notice also that, unlike the basic compensators, the form of the new compensators presented in Eq. 5 depends on the measured sub-aperture data. Aside from the fact that care must be taken in estimating the derivatives with an appropriate numerical scheme, this does not significantly complicate the stitching.

It is intuitively clear that the distortion will be resolved more easily when stitching on a part that has significant mid-spatial frequency deviation from a sphere: changing the distortion then gives the freedom to register this surface structure in the overlap regions more accurately. Performing a calibration test with a specially-tailored part and appropriately-configured overlap is therefore an effective step to characterize the distortion sufficiently. The corrections to the nominal distortion that are found in this way can henceforth be absorbed into subsequent data processing to give greater accuracy. If the original estimate was significantly in error, it is possible to iterate this process (each time using the same data sets but with the newly refined estimate of the nominal distortion) until the first-order Taylor expansion of Eq. 4 introduces negligible error. If the original estimate of the system distortion was sufficiently accurate, this iteration will be unnecessary; the first refinement is all that is required.

Once these calibration tests have been used to refine the nominal distortion, the associated compensators would be unnecessary for subsequent tests of similar parts, providing that the setup of the interferometer optics (such as the zoom setting) is unchanged. Of course, these compensators can also be retained with minimal cost in order to account for variations between parts of different curvature etc. The innovation described herein means that a system in accordance with the invention ensures that there is a well defined map (of a form that can be chosen at will) from each point in the stitched data to its associated point on the surface of the test part. This is vital information in certain applications. For example, current optical fabrication techniques use sub-aperture figure correction and, for this, it is clear that the point-to-point correspondence between the data map and the part's surface must be known accurately. This represents another of the strengths of the results from the present stitching system.

Compensators to Correct for Positioning Errors of the Data

As indicated above, the four basic compensators for stitching on a sphere are found by considering the change in the measured data that is associated with slight motions of a perfectly spherical part. Since a test part is never a perfect sphere, positioning errors are also manifested as translations and rotations of the sub-aperture data sets themselves. Although it is possible to optimize over exact repositioning of the data sets as part of the process of placing them on a global coordinate plane, this turns the stitching into a computationally demanding non-linear process. This is the approach used in the simple prior art case of pair-wise stitching on flats. Instead, the present method uses a linear approximation to the repositioning (including rotation and two translations) and can therefore once again just introduce new compensators to the stitching process. A similar idea was mentioned for sag-based measurements in U.S. Pat. No. 5,960,379, but this idea was ignored in repositioning in their data analysis. These additional compensators turn out to be natural partners to the distortion compensators: in general, one or other of these options is ineffective on its own, but together they can significantly improve the registration of the sub-aperture data sets, and thereby deliver greater accuracy in the full-aperture stitched map.

By way of demonstration, consider the case of stitching on a flat part with an interferometer that is nominally distortion-free. An approximation to the sub-aperture data set characterized by f(x,y), after small translations and rotation, can be written as $$f(x, y) + s\frac{\partial f}{\partial x}(x, y) + t\frac{\partial f}{\partial y}(x, y) + \delta\left[x\frac{\partial f}{\partial y}(x, y) - y\frac{\partial f}{\partial x}(x, y)\right], \quad \text{(Eq. 6)}$$

where s and t are the shifts in x and y, respectively, and $\delta$ is the angle of the rotation. The factors on s, t, and $\delta$ in Eq. 2 are the new compensators for position correction in this case. As in the previous subsection, upon replacing f(x,y) in Eq. 1 with the entire expression in Eq. 6, it is clear that these new compensators play precisely the same role as the conventional ones: after mapping the sub-aperture data sets and the compensators to the global coordinate plane, the values of s, t, and $\delta$ for each sub-aperture data set, as well as the coefficients for all other compensators, are chosen to minimize any discrepancy in the regions of overlap on the global plane. Also notice that, like the distortion compensators, the positioning compensators in Eq. 6 also depend on the measured sub-aperture data.

Notice that the form of the rotation compensator given in Eq. 6 applies to all cases involving axially symmetric systems: it generates a purely azimuthal change that is independent of the radial distortion. On the other hand, when the nominal distortion is significant (e.g., for sub-aperture tests of moderate numerical aperture on a sphere), the translation compensators must be modified to be consistent with the associated point-to-point mapping between the test surface and the data map for a sub-aperture. (The radial coordinate chosen for the global plane is, of course, irrelevant here.) Regardless of the form of the nominal distortion, these compensators always involve just the first derivatives of the data and can be found from elementary geometrical considerations.

Figure 14:
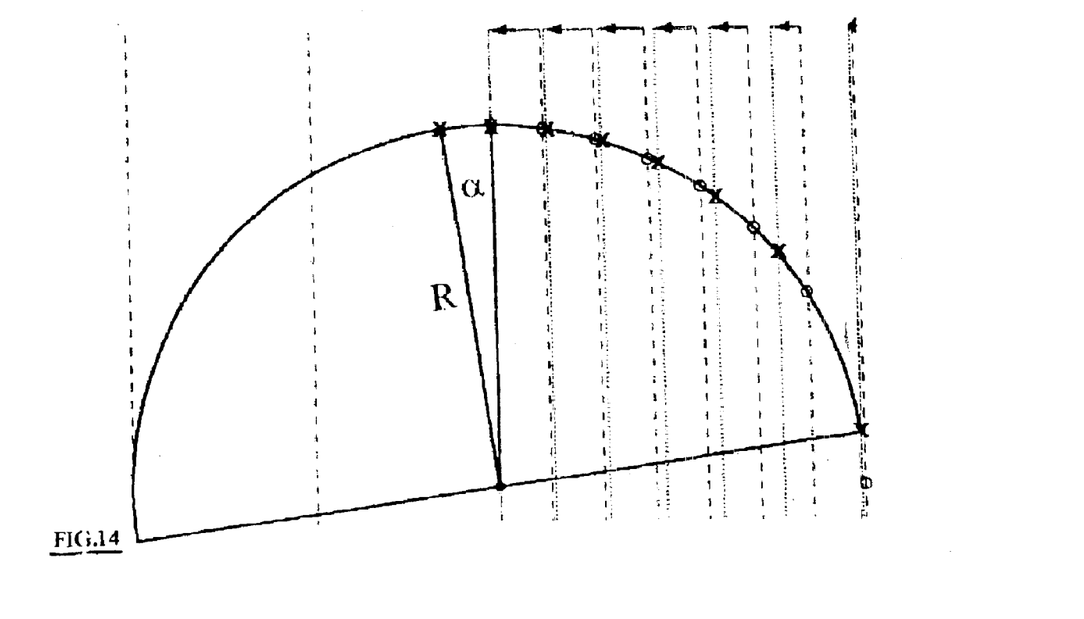
FIG. 14 is a meridional section showing an example of interaction between mapping and placement errors.

As an example, consider an interferometer with sine-like nominal distortion. In this case, the correspondence between points on the spherical surface and points on the detector is (to within a uniform magnification and rotation) equivalent to a simple shadow-forming process. In particular, in terms of a Cartesian coordinate system with its origin at the center of the spherical test surface and its z axis cutting the surface at the center of its aperture, the points on the surface can be mapped to the (x,y) plane by projecting them parallel to the z axis. That is, they are simply mapped to their shadow on the equatorial plane. Now, as shown in FIG. 14, a small rotation of the sphere about the y axis moves each shadow point purely in the x direction, but the distance that the shadow points move is clearly smaller for points that are further from the origin. Elementary geometry shows that if the point at the center moves by s, the other points move by $[1-(x^2+y^2)/R^2]^{1/2}s$ where R is the radius of curvature of the sphere. It follows that both of the translation compensators in Eq. 6 simply pick up this square root factor for this case. (Notice that this factor is less significant for sub apertures of small numerical aperture, i.e. $x^2+y^2 \ll R^2$.)

Much as with the distortion compensation, it is possible to solve the non-linear problem mentioned above by using an iterative stitching scheme based on the present linear position compensation. That is, the current estimates of the optimal translations and rotation can be used to perform a more exact transformation on the sub-aperture data, and this modified data can then be re-stitched. By repeating this process (always interpolating off the original data during the process of mapping it to the global plane) until no further adjustments are called for, it is possible to correct efficiently and accurately for larger placement errors. This iteration can be performed simultaneously with that for refining the nominal distortion. Of course, this iteration is necessary only when the repositioning associated with the placement and distortion errors approaches or exceeds the transverse scale of the non-linear variations in the measured data. When the hardware is sufficiently accurate and the nominal distortion is sufficiently well known up front, there is no need for iteration; the combined approximations in Eqs. 5 and 6 are adequate on their own.

Including the placement and distortion compensators leads to superior stitched results. An important consequence of this step is that the mechanical accuracy that is demanded of the hardware platform used for repositioning the test part can be loosened significantly. This clearly boosts the system's effectiveness.

Compensators to Correct for Reference Wave Errors

A spatially varying bias is a consistent type of error in surface figure measurement. For example, in either a Fizeau or a Twyman-Green interferometer, any figure error in the reference surface prints through in the same way in each subaperture data set. Again, the ill-conditioned character of stitching means that, unless it is corrected for, this reference wave error can be magnified in the subsequent processing of the data. Regardless of its source, however, a heavily overlapped calibration test using the present stitching system is an ideal way to detect and correct for any errors of this type. This can be achieved efficiently by using a polynomial fit to the bias. It is natural here to use polynomials that are orthogonal over the sub-aperture and, for circular sub-apertures, this leads to the Zernike polynomials. Since the bias is generally dominated by slowly varying components, significant improvements can be found upon retaining even just the lower-order terms in this decomposition.

The basic idea of this step therefore is to replace each sub-aperture data set by $$f(x, y) + \sum_k \zeta_k Z_k(x, y) \quad \text{(Eq. 7)}$$

where $Z_k(x,y)$ is the k'th Zernike polynomial (arranged according to increasing order, but those of equal order can be arranged arbitrarily) and $\zeta_k$ is the associated stitching coefficient. The sum in Eq. 7 can include as many terms as required. Since this step corrects for fixed errors in the interferometer, these compensators are also necessarily interlocked. That is, these stitching coefficients take the same values for all of the sub-apertures, just like those for distortion compensation. As in that case, after the initial, heavily-overlapped calibration tests, these compensators may be disabled for production tests. These subsequent tests can employ fewer sub-apertures and still be sufficiently well conditioned. To account for variations such as thermal changes, it is also possible to retain these compensators without incurring prohibitive additional computational cost.

Constraints on the Optimization and the Merit Function

Additional compensators make the stitching process even more ill conditioned. Keep in mind that the option for an arbitrarily large number of new compensators has been introduced in the previous subsections in order to deal with the correction of distortion and reference wave errors alone. Thankfully, only a modest number of terms are required in practice, and the interlocking of these new terms helps to curtail their destabilizing effect. The placement compensators are not interlocked, however, and these alone almost double the number of compensators that have been used in conventional stitching. As a result, the ideas presented above are often impractical on their own. One other conceptual development improves the effectiveness of the present system. In particular, the stitching coefficients must always be required to remain within meaningful bounds. That is, the discrepancy in the overlap regions is now minimized subject to natural constraints imposed by various components of the measurement system.

Since each compensator corrects for some uncertainty in the data gathering process, prior knowledge of the hardware serves to define the associated constraints on the stitching coefficients. For example, since the compensators for tilts, power, and the repositioning of the data all serve to account for small misplacement errors, their allowed magnitude follows from the known accuracy of the mechanical stages. That is, it would be inconsistent to allow more of any of these terms than could have been generated by a placement error of the order of the mechanical accuracy of the hardware.

Analogous bounds can also be placed on reference wave and distortion uncertainties. Consider the case of a surface-measuring interferometer. The global magnification error ($d_0$) would be constrained by the estimated quality of the pixel scale calibration. This could range from a few percent down to fractions of a percent if a precise calibration were done. The higher-order distortion terms ($d_1$ and higher) would be constrained by the specifications on the imaging system (e.g. a quoted distortion specification of <3%). It is relatively straightforward to apportion this error, since only one or two terms are generally used. The reference wave constraints would be tied to the known quality of the reference surface. In practice there can be dozens of Zernike terms representing the reference surface, and each can have its own constraint. Any a-priori knowledge of the reference surface allows the constraints to be better specified, but the details are unimportant for most practical lattice geometries.

These constraints prevent the "wild" solutions that would otherwise emerge due to a combination of ill conditioning and various random errors in the sub-aperture data (such as thermal turbulence). They are also essential to the development of a meaningful uncertainty analysis for the stitched results, as discussed in the next section.

Furthermore, the constraints resolve a conceptual floor of conventional stitching methods. For example, although a flat is just a sphere of infinite radius, conventional stitching involves three compensators when working with flats, but an additional one (namely power) must be included for spheres. For cases with progressively larger radius, the prospect of abruptly switching between three and four compensators is an ugly one. That is, how large must the radius of curvature be before the power term should be dropped? Since the amount of power generated by a placement error is known to be proportional to the axial positioning error divided by the square of the part's radius of curvature, the contribution from this compensator must be constrained to be near zero when the part is nearly flat. That is, our constraints mean that the power term smoothly drops out of play as the radius increases: we can now always stitch with all four basic compensators.

Since the bounds on the stitching coefficients are generally only loosely quantified, it is convenient to transform them into a form that is computationally most effective. One option is to fit an ellipsoid to the allowed region for these coefficients. For simplicity, it is assumed that this ellipsoid is aligned to the axes in the stitching coefficient coordinate space. It is convenient then to scale each of the compensators so that the associated stitching coefficient is expected to be less than unity in magnitude. In this way, the allowed region becomes the unit sphere centered at the origin. By using either a Lagrange multiplier or, equivalently, a penalized merit function, it is straightforward then to find the solution with minimum discrepancy that falls within this unit sphere. Because the functions involved are both just quadratics in the stitching coefficients, this reduces to computationally straightforward linear algebra.

The minimization is most easily stated once a sampling grid has been chosen for the global coordinate plane. The stitched data set is taken to be defined by the sample points on this grid and, much like the radial distortion on this plane, the form of the grid can be chosen for convenience: it could be hexagonal, polar, or Cartesian, for example. Since the sub-aperture data are taken from a CCD and the stitched result will be viewed on a pixilated screen, both of which are rectangular, it is generally convenient to choose a Cartesian grid. If the coordinates on the global plane are written as (X,Y) or more simply as X, the grid points, after being ordered conveniently, can be written as X, for l=1,2, ... L. Their density can be chosen so that the associated points on each sub-aperture data set roughly match its resolution; it is not useful to choose their density to be larger than this, but it may be convenient to make it smaller. After interpolating to find the values of the j'th sub-aperture data set at the grid points on the global plane, we end up with $f_j(X)$. Similarly, the scaled non-interlocked compensators for this data can be used to generate $g_{jk}(X)$ for k=1,2, ... K where K is the number of these compensators in use (typically seven: four basic compensators plus the three for data repositioning). Also, the scaled, interlocked compensators become $G_{j\gamma}(X)$ for γ=1,2, ... Γ, where Γ is the number of compensators used to correct for interferometer errors such as distortion and reference wave errors.

The compensated data sets can now be written as $$F_j(X) = f_j(X) + \sum_k a_{jk} g_{jk}(X) + \sum_\gamma \alpha_\gamma G_{j\gamma}(X) \qquad \text{(Eq. 8)}$$

where $a_{jk}$ and αγ are the stitching coefficients. The scaling discussed above means that the sum of the square of these coefficients is required to be less than unity. Notice that interlocking means that the coefficients on $G_{j\gamma}(X)$ have the same value for all the sub-apertures, i.e., these coefficients are independent of j. The basic task of the stitching is to find the values for these coefficients that fall within the unit sphere and minimize the mean square difference between any overlapping values. At any grid point, the stitched data will then be taken to be a weighted average over all the compensated values that have been derived from the sub-aperture data sets at that point:

$$S(X_l) = \sum_j w_j(X_l) F_j(X_l) \bigg/ \sum_j w_j(X_l) \qquad \text{(Eq. 9)}$$

where $w_j(X_l)$ is the weight associated with the j'th data set at the point $X_l$. As an example, this weight can be taken to be the inverse of the estimated variance of this data point. At points that are not spanned by the j'th data set, $w_j(X_l)$ is taken to be zero. Of course, at any point where all of the weights are zero, the stitched data remain undefined.

A convenient definition for the spread in the multiple values at any point of overlap is a weighted variance of the form $$v(X_l) = \sum_j w_j(X_l)[F_j(X_l) - S(X_l)]^2 \Big/ \sum_j w_j(X_l) \quad \text{(Eq. 10)}$$

The overall discrepancy measure, ie. the merit function for the stitching, can then be taken to be a weighted average of these variances:

$$M = \sum_l W(X_l)v(X_l) \Big/ \sum_l W(X_l) \quad \text{(Eq. 11)}$$

The-weights used here, ie. $W(X_l)$, can be chosen to be inversely related to the expected variance in $v(X_l)$. Since the errors in the separate compensated sub-aperture data sets can be assumed to be independent, this variance follows from simple statistical methods. By using the same standard methods, it is also possible to estimate the expected variance in the value of the merit function, i.e., in M, which we write as $\sigma_m^2$. (When all the errors are assumed to be independent, it turns out that $\sigma_M$ is roughly $M_{min}\sqrt{2/N}$ where $M_{min}$ is the minimum value of M and N is the total number of values interpolated from the sub-aperture data sets minus the number of valid pixels in the full-aperture stitched map.)

Uncertainty in the Stitched Data and the Best-Fit Solution

A crucial observation at this point is that both $F_j$ and S depend linearly on the stitching coefficients. It then follows from Eqs. 9 and 10 that the merit function is just a quadratic in these variables. The process of minimization subject to the quadratic constraint is therefore straightforward. What is more, a vital measure of uncertainty in the solution can now be arrived at. The merit function value for all the plausible solutions lies within $\sigma_M$ of $M_{mm}$. This condition, namely $M<M_{mm}+\sigma_M$, defines an ellipsoid. Therefore, any points within the intersection of this ellipsoid with the spheroid associated with the constraints are of interest. All points in this region are equally plausible as solutions. Any of these points can be characterized by determining the rms value of the associated stitched data. The point for which this rms is a minimum is referred to as the best-fit solution. Upon fitting an ellipsoid to this region of intersection and rescaling to convert it to a spheroid, it is also possible to characterize the variations in these solutions. Since the mean square value of the stitched data is once again a quadratic in these rescaled stitching coefficients, the principal directions of this quadratic single out the most significant uncertainties in the stitched result.

This tool provides an estimate of the quality of the stitch (i.e. an error estimate), as well as the most likely shapes of the error. For example, tilt and DC will be reported as very strong uncertainty components on a flat measurement. The uncertainty generator also reports other terms (of lower magnitude) that will indicate uncertainty contributions from the stitching process.

In addition to estimating the uncertainty in a particular stitched measurement, the uncertainty evaluator allows the process to be evaluated more generally. Consider the lattice 16 shown previously in FIG. 5; what makes this lattice better or worse than another? The only firm requirement is that the lattice cover the part completely. Any additional overlap will contribute to noise suppression, but requires additional sub-apertures (and thus time). It is unclear how much overlap is optimal. Hundreds of sub-apertures would provide tremendous overlap and averaging, but would be extremely time-intensive (both in acquiring the data and computing the result) and be susceptible to measurement drift. On the other hand, the bare minimum sub-apertures for complete part coverage may give an inaccurate stitched result. The uncertainty evaluator provides objective measures of the stitching algorithm robustness. The relative robustness of various lattice shapes can be simulated without actually acquiring any "real" data. This allows the process to be optimized for various part types, subject to constraints on the stitched accuracy and acquisition time.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for synthesizing a full-aperture numerical data map of a test surface of an object from a plurality of overlapping sub-aperture data maps of said surface, comprising the steps of:
   a) collecting said plurality of sub-aperture numerical data maps of said surface from a plurality of regions of said surface, at least a portion of each such map overlapping a portion of at least one adjacent map to create a region of overlapping data;
   b) projecting said plurality of overlapping data maps onto a global coordinate system with a nominal distortion map;
   c) selecting a plurality of error compensators from one of two groups consisting of free compensators having free amplitude range and interlocked compensators having identical constrained amplitudes to compensate for stitching errors in said overlapping data regions; and
   d) simultaneously minimizing mismatch of data from each of said data maps in said overlapping regions through linear combinations of said compensators.

2. A method in accordance with claim 1 further comprising the step of selecting constraints on said compensator amplitudes.

3. A method in accordance with claim 2 wherein said selecting constraints on said compensator amplitudes includes the steps of:
   a) determining inaccuracies derived from measurement apparatus used to collect said plurality of sub-aperture data maps; and
   b) incorporating said apparatus inaccuracies into said numerical solution in synthesizing said full-aperture numerical data map.

4. A method in accordance with claim 1 further comprising the step of weighting the significance of individual data values within each of said sub-aperture data maps to reduce the sensitivity of said numerical solution to less-significant data points.

5. A method in accordance with claim 1 wherein said individual measurements are obtained via measurement tools including an interferometer, and wherein said interferometer and said object having said test surface are disposed on a multi-axis stage.

6. A method in accordance with claim 5 wherein said interlocked compensators are employed to obtain and compensate for spatially-dependent system biases of said measurement tools.

7. A method in accordance with claim 6 wherein said system biases include deviations from a nominal pixel scale and distortion map of said interferometer.

8. A method in accordance with claim 6 wherein a reference wave error in said interferometer is calibrated, said reference wave being modeled with an orthogonal basis set and each term in said set being represented by an interlocked compensator.

9. A method in accordance with claim 1 wherein said linear free compensators are employed in a first-order correction for sub-aperture placement error.

10. A method in accordance with claim 1 comprising the further steps of:

a) estimating actual shift and scale errors as inferred from said compensator amplitudes;

b) refining said measurement data positions and mapping by applying said estimated shift and scale errors to said original data positions; and c) projecting said refined measurement data positions onto said global coordinate system to re-minimize said overlapped data mismatch.

11. A method in accordance with claim 1 for improving the accuracy of a synthetic full-aperture numerical data map of a test surface of an object derived from a plurality of overlapping sub-aperture data maps of said surface, comprising the further steps of iteratively performing the steps of claims 1 and 10.

* * * * *